United States Patent [19]

Tsuboi et al.

[11] Patent Number: 4,506,042

[45] Date of Patent: Mar. 19, 1985

[54] CURABLE RESIN COMPOSITION COMPRISING N-(ALKENYLPHENYL)MALEIMIDE, EPOXY COMPOSITION AND POLYAMINE

[75] Inventors: Hikotada Tsuboi; Motoo Kawamata; Masayuki Oba; Nobuhito Koga, all of Yokohama, Japan

[73] Assignee: Mitsui Toatsu Chemicals, Inc., Tokyo, Japan

[21] Appl. No.: 471,204

[22] Filed: Apr. 4, 1983

Related U.S. Application Data

[62] Division of Ser. No. 312,959, Oct. 20, 1981, Pat. No. 4,401,777.

[51] Int. Cl.³ .................. C08L 63/00; C08L 67/00; C08L 77/00
[52] U.S. Cl. ........................ 523/454; 523/508; 523/510; 523/511; 524/77; 525/178; 528/322
[58] Field of Search ............ 528/322, 111, 117; 525/422, 178; 523/454, 455, 456, 461, 508, 510, 511; 524/104, 108, 113, 205, 361, 376, 378, 77

[56] References Cited

U.S. PATENT DOCUMENTS 4,401,777 8/1983 Tsuboi et al. .................. 528/322

FOREIGN PATENT DOCUMENTS 54-68899 6/1979 Japan .

Primary Examiner—Harold D. Anderson
Attorney, Agent, or Firm—Fisher, Christen & Sabol

[57] ABSTRACT

Disclosed is a curable resin composition comprising (a) at least one maleimide compound selected from the group consisting of N-(alkenylphenyl)maleimide derivatives, and dimers and polymers thereof and (b) one or more kinds of epoxy resins, each having at least one epoxy group in the unit molecule thereof. The resin composition may contain, besides the above two components, an amino compound as a further component (c). The resin composition may comprise a prepolymer of any two components among the three components (a), (b) and (c) and the remaining component. The resin compositions are useful as molding materials, for the fabrication of laminates, and as varnishes, including insulation varnishes and impregnating varnishes.

28 Claims, No Drawings

CURABLE RESIN COMPOSITION COMPRISING N-(ALKENYLPHENYL)MALEIMIDE, EPOXY COMPOSITION AND POLYAMINE

This is a division of application Ser. No. 312,959, filed Oct. 20, 1981 now U.S. Pat. No. 4,401,777.

BACKGROUND OF THE INVENTION (1) Field of the Invention

This invention relates to a resin composition capable of yielding a cured material excellent in heat resistance, and more particularly, it relates to a curable resin composition capable of providing varnish of improved workability and stability as well as formed products of excellent curability and physical and chemical properties.

(2) Description of the Prior Art

Maleimide-type resins are known as resins having excellent resistance to heat and are used, for example, in the form of polymaleimide resin which is a homopolymer of a maleimide compound or polymaleimide-polyamine type resin which is a copolymer with an amine. These maleimide-type resins can generally provide satisfactory properties with respect to resistance to heat. However, prior to polymerization, such maleimide compounds have a high melting point and, moreover, can be hardly dissolved in an organic solvent commonly used for the production of varnish and laminates. Due to the above-described nature of maleimide compounds, they are accompanied by a drawback that they must be dissolved in a polar solvent having a high boiling point and high hygroscopicity prior to their application. Thus, an impregnating varnish may be prepared from such a maleimide compound by using a polar solvent represented by N-methyl-2-pyrrolidone, N,N-dimethylacetamide, or N,N-dimethylformamide. Use of such a solvent however is not preferable as it is not only expensive but also susceptible of penetrating through the skin and absorbed in the human body, in other words, it is very, toxic.

Furthermore, when a laminate is produced with varnish containing such a solvent, the solvent will become a main cause for deteriorating the properties of the laminate as it tends to remain in the final product to be obtained upon heating and curing same.

Where a usual maleimide-type resin is employed for the production of a copper-lined laminate, the adhesion between a copper foil and the substrate is not always good and its workability such as blanking work is not satisfactory.

On the other hand, epoxy resins are extensively used as various electric insulators, molded products, adhesive and paint since they can generally afford, upon curing same with a wide variety of curing agents, cured products excellent in electrical characteristics, mechanical characteristics, dimensional stability and chemical resistance.

However, depsite having such excellent properties, conventional epoxy resins are considered to be unsatisfactory with respect to resistance to heat. Thus, varied methods have been taken into consideration with a view toward enhancing their resistance to heat.

To obtain a resin excellent in varied properties and assuring big commercial utility by maintaining the advantageous features of these two resins and simultaneously compensating for their drawbacks, it has been attempted to incorporate a maleimide compound in epoxy resin. However, it was very difficult to obtain a uniform and stable composition which is suitable for actual use, as conventional general maleimide compounds are considerably poor in their miscibility with epoxy resins and, for example, when formulated into varnish using a solvent, such varnishes are susceptible to separation and, when employed for solventless casting, the maleimide compounds tend to deposit as crystals.

SUMMARY OF THE INVENTION

An object of this invention is to provide a stable and uniform composition of at least one N-(alkenylphenyl)maleimide compound and one or more kinds of epoxy resins.

Another object of this invention is to provide a curable resin composition which can be formulated into a form suitable for application by using a commonly-used solvent of a relatively low boiling point.

A further object of this invention is to provide a curable resin composition featuring improved work efficiency and facilitating the removal of solvent from cured products.

A still further object of this invention is to provide a curable resin composition capable of yielding a molded product having excellent resistance to heat and excellent mechanical strength at elevated temperatures.

N-(Alkenylphenyl)maleimides, their dimers and their polymers having a polymerization degree of at least 3 contain, besides unsaturated bonds of maleimido group, other unsaturated bonds originated from alkenyl groups or their polymers, which unsaturated bonds form strong bonds with the epoxy compound or compounds or curing agent, whereby increasing the crosslinking density of the resulting cured product and, corollary to this, providing a molded product having excellent heat resistance and outstanding mechanical strength at high temperatures. In a product obtained by curing a resin composition according to this invention, the heat resistance which is inherent to a general maleimide compound is further enhanced. In addition, the product maintains sufficiently the excellent properties of an epoxy resin. Accordingly, it is equipped with properties promising its application in the electronic field where a high degree of accuracy and reliability is required.

DETAILED DESCRIPTION OF THE INVENTION

The curable resin composition according to this invention comprises:

(a) at least one maleimide compound selected from the group consisting of N-(alkenylphenyl)malemides represented by the general formula (I):

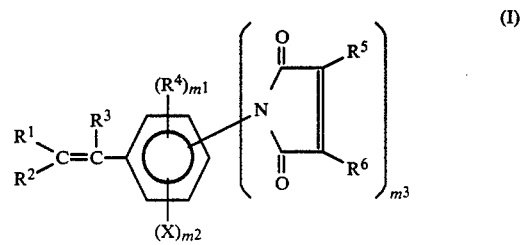

wherein $R^1$–$R^6$ may be the same or different from one another and denote independently hydrogen, a hydrocarbon group having 1-20 carbon atoms, a halogen, R⁷O— or

group (where R⁷ represents a hydrocarbon group having 1-20 carbon atoms or a hydrocarbon group having 1-20 carbon atoms and substituted by one or more halogen atoms of at least one kind), hydroxyl group, cyano group, or a hydrocarbon group substituted by one or more halogens, R⁷O— or

group (where R⁷ is as defined above), hydroxyl group or cyano group and having 1-20 carbon atoms prior to the substitution, a plurality of R⁴s may be the same or different when m¹ stands for a value of 2 or greater, R⁵ may be coupled with either R¹ or R², thereby forming a ring, X denotes at least one atom or group selected from hydrogen, halogens, hydroxyl group, R⁷O—,

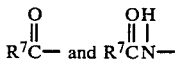

groups (where R⁷ is as defined above), cyano group, nitro group and carboxyl group, a plurality of Xs may be the same or different when m² stands for a value of 2 or greater, and m¹, m² and m³ represent independently a positive integer and m¹+m²+m³=5, dimers of said maleimides and polymers of said maleimides having a polymerization degree of at least 3; and (b) one or more kinds of epoxy resins, each having at least one epoxy group in the unit molecule thereof.

Furthermore, the curable resin composition according to this invention may also contain, in addition to (a) at least one maleimide compound represented by the above general formula (I) and (b) one or more kinds of epoxy resins, each, having at least one epoxy group in the unit molecule thereof, (c) an amino compound represented by the general formula (II):

   (II)

wherein Q indicates an organic group having 1-150 carbon atoms and a valence of n, Q may contain at least one kind of atom selected from hydrogen, oxygen, sulphur, halogen, nitrogen, phosphor and silicon atoms, and n stands for an integer of at least 1. This curable resin composition may contain at least one kind of a prepolymer of at least parts of any two components among components (a), (b) and (c).

The N-(alkenylphenyl)maleimide compounds, its dimers and its polymers having a polymerization degree of at least 3 as well as their amine derivatives have excellent solubility to solvent compared with general maleimide compounds and their amine derivatives as well as extremely good miscibility with epoxy resin. Owing to such solubility and miscibility, as already mentioned above, the present inventors have succeeded in obtaining a stable and uniform composition of a maleimide compound and epoxy resin, which composition has scarcely been obtained heretofore, through the use of a novel maleimido compound of the formula (I) as its maleimide component. Without depending on a polar organic solvent such as N-methyl-2-pyrrolidone, N,N-dimethylformamide or N,N-dimethylacetamide which has been used for compositions containing conventional maleimide compounds, the resin composition according to this invention may be satisfactorily applied by using a general organic solvent of a relatively low boiling point. Thus, the resin composition according to this invention not only leads to an improved work efficiency but also renders the removal of solvent from resulting products easy, and also provides a cured product of considerably improved quality.

As examples of N-(alkenylphenyl)maleimides represented by the above general formula (I) and usable in the present invention, there are:
N-(o-vinylphenyl)maleimide;
N-(m-vinylphenyl)maleimide;
N-(p-vinylphenyl)maleimide;
N-(o-isopropenyl)maleimide;
N-(m-isopropenylphenyl)maleimide;
N-(p-isopropenylphenyl)maleimide;
N-(vinyltolyl)maleimide, including all isomers thereof;
N-(isopropenyltolyl)maleimide, including all isomers thereof;
N-(p-α-ethylvinylphenyl)maleimide;
N-(m-α-ethylvinylphenyl)maleimide;
N-(p-α,β-dimethylbiphenyl)maleimide;
N-(m-α,β-dimethylvinylphenyl)maleimide;
N-(p-α-methyl-β-isopropylvinylphenyl)maleimide;
N-(m-α-methyl-β-isopropylvinylphenyl)maleimide;
N-(p-α-isobutylvinylphenyl)maleimide;
N-(m-α-isobutylvinylphenyl)maleimide;
N-(p-1-cyclohexenylphenyl)maleimide;
N-(m-1-cyclohexenylphenyl)maleimide;
N-(o-vinylphenyl)-3,4-dichloromaleimide;
N-(m-vinylphenyl)-3,4-dichloromaleimide;
N-(p-vinylphenyl)3,4-dichloromaleimide;
N-(p-isopropenylphenyl)-3,4-dichloromaleimide;
N-(m-isopropenylphenyl)-3,4-dichloromaleimide;
N-(o-isopropenylphenyl)-3,4-dichloromaleimide;
N-(p-isopropenylphenyl)-3,4-dibromomaleimide;
N-(p-isopropenylphenyl)-3,4-difluoromaleimide;
N-(4-vinyl-2-methoxyphenyl)maleimide;
N-(4-vinyl-3-methoxyphenyl)maleimide;
N-(4-isopropenyl-2-methoxyphenyl)maleimide;
N-(3-isopropenyl-4-methoxyphenyl)maleimide;
N-(4-vinyl-2-acetylphenyl)maleimide;
N-(4-isopropenyl-2-acetylphenyl)maleimide;
N-(4-vinyl-2-hydroxyphenyl)maleimide;
N-(4-isopropenyl-2-hydroxyphenyl)maleimide;
N-(4-isopropenyl-3-cyanophenyl)maleimide;
N-(4-isopropenyl-2-cyanophenyl)maleimide;
N-(4-vinyl-2-cyanophenyl)maleimide;
N-(p-α-chloromethyl-β-chlorovinylphenyl)maleimide;
N-(p-α-dichloromethyl-β-dichlorovinylphenyl)maleimide;
N-(p-α-bromomethyl-β-bromovinylphenyl)maleimide;
N-(p-vinylphenyl)-3-cyanomaleimide;
N-(p-vinylphenyl)-3,4-dicyanomaleimide;
N-(p-isopropenyl)-3,4-dicyanomaleimide;
N,N'-(1-vinyl-2,4-phenylene)bismaleimide;
N,N'-(1-vinyl-3,5-phenylene)bismaleimide;
N,N'-(1-isopropenyl-2,4-phenylene)bismaleimide;
N,N'-(1-isopropenyl-3,5-phenylene)bismaleimide;
N-(p-vinylphenyl)-3,4-di-t-butylmaleimide;
N-(p-isopropenylphenyl)-3,4-diisopropylmaleimide;
N-[4-α-(p-cyanophenyl)vinylphenyl]maleimide;

N-[4-α-methyl-β-(m-chlorophenyl)vinylphenyl]maleimide;
N-[4-α-(p-methoxyphenyl)vinylphenyl]maleimide;
N-[4-α-methyl-β-(m-acetylphenyl)vinylphenyl]maleimide;
N-[4-α-methyl-β-(p-hydroxyphenyl)vinylphenyl]maleimide;
N-(p-isopropenylphenyl)-3-(p-acetylphenyl)maleimide;
N-(p-vinylphenyl)-3-(p-methoxyphenyl)maleimide;
N-(m-isopropenylphenyl)-3-(p-chlorophenyl)maleimide;
2-isopropenyl-4-N-maleimido-4'-chlorobiphenyl;
4-isopropenyl-2-N-maleimido-4'-methylbiphenyl;
3-isopropenyl-4-N-maleimido-3'-methoxybiphenyl;
3-vinyl-4-N-maleimido-4'-hydroxybiphenyl;
3-isopropenyl-4-N-maleimido-4'-acetylbiphenyl;
2-N-maleimido-4-isopropenyl-4'-cyanobiphenyl;
N-(4-vinyl-3-nitrophenyl)maleimide;
N-(4-isopropenyl-3-carboxyphenyl)maleimide; and
N-(4-isopropenyl-3-acetylaminophenyl)maleimide.

In the present invention, dimers and/or trimers of the above N-(alkenylphenyl)maleimides may be used. As examples of such dimers of N-(alkenylphenyl)maleimides, there may be mentioned linear dimers of N-(p-isopropenylphenyl)maleimides, represented by the following formulae (III) and (IV):

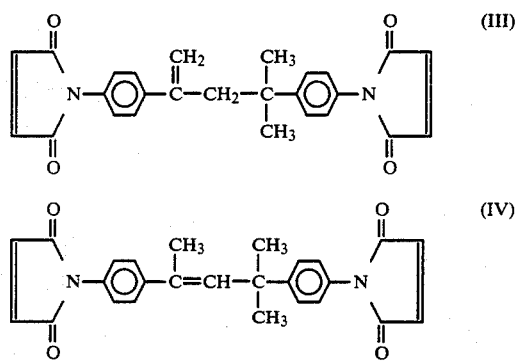

On the other hand, the polymers of N-(alkenylphenyl)maleimides are not limited to any specific polymers, but such polymers desirously have a molecular weight not higher than 10,000.

These dimers and polymers of N-(alkenylphenyl)maleimides are generally prepared by dimerizing or polymerizing N-(alkenylphenyl)maleimides in the presence of a suitable catalyst. Particularly in the case of a linear dimer and polymer of N-(p-isopropenylphenyl)maleimide, the following production method may be followed. Namely, in a first step of the reaction process, a maleamic acid is prepared by causing maleic anhydride to react with the dimer or polymer of p-isopropenylaniline which has been obtained beforehand by heating p-isopropenylaniline in an inert organic solvent, if necessary, in the presence of an acidic catalyst. Then, in a second step of the reaction process (i.e., dehydrocyclization reaction), the dimer or polymer is imidated in the presence of a catalyst into bismaleide or polymaleide. This two-step process is known per se in the art.

As specific examples of an epoxy resin usable in the present invention and having at least one epoxy group in its unit molecule, there may be mentioned bisphenol-A epoxy resin, bisphenol-F epoxy resin, phenol novolak epoxy resin, cresol novolak epoxy resin, alicyclic epoxy resins, heterocyclic epoxy resins such as triglycidylcyanurate, triglycidylisocyanurate and N,N-diglycidyl-5,5-dimethylhydantoin, hydrogenated bisphenol-A epoxy resins, aliphatic epoxy resins such as propyleneglycol diglycidylether and pentaerythritol polyglycidylether, epoxy resins obtained from the reactions between aliphatic or aromatic carboxylic acids and epihalohydrins such as epichlorohydrin, epoxy resins containing one or more spiro-rings, and glycidylether type epoxy resins which are reaction products of o-arylphenol novolak compounds and epichlorohydrin. In the various glycidyl compounds mentioned above, at least some of the glycidyl groups may be β-methylglycidyl groups.

In the curable resin composition according to this invention, the weight ratio of the epoxy resin to the maleimide compound is preferably in a range of 3:97-97:3, more preferably, 5:95-95:5. If the epoxy resin is used below its lower limit, excellent mechanical properties, good adhesiveness to glass cloth or copper foil, good dimensional stability and preferred electrical characteristics, all inherent to epoxy resin, can be hardly recognized. Any product resulting from such a composition is relatively brittle. Thus, the effects of this invention will be lost. On the other hand, if the epoxy resin is employed beyond its upper limit, the effects of the maleimide component used in the present invention will not be recognized, particularly, resulting in deterioration of the heat resistance of a cured product to be obtained.

In the curable resin composition according to this invention, at least parts of the maleimide compound and epoxy resin may be present in the form of a prepolymer thereof so long as the effects of this invention are not hampered.

Although a curing agent for the epoxy resin is not necessarily essential to the composition of this invention, it may be possible to employ such a curing agent together with the epoxy resin as needed. Here, the curing agent may be employed in any suitable amount. However, it shall not be used in such an amount that it impedes the excellent effects derived from the maleimido compound and epoxy resin respectively. The amount of such a curing agent should thus be limited within such a range that it improves the properties of the composition according to this invention. Among curing agents which may be employed as needed, there are trifluoroboron-amine complexes such as trifluoroboron-monoethylamine complex and trifluoroboron-piperidine complex; tertiary amines such as triethylamine, benzylmethylamine, hexamethylene tetramine and N,N-dimethylaniline; quaternary ammonium salts such as tetramethyl ammonium bromide; borate compounds such as triphenyl borate and tricresyl borate; imidazole compounds such as N-methylimidazole, N-ethylimidazole, N-phenylimidazole and N-vinylimidazole; metallic compounds such as zinc acetate, sodium acetate, cobalt naphtenate, titanium acetylacetonate, iron acetylacetonate, nickel acetylacetonate, sodium methylate, sodium ethylate and tetrabutoxy titanate; amide, urea and melamine compounds obtained from amine compounds and carboxylic acid compounds; dicyano diamides; phenol compounds such as phenol resins obtained from reaction between bisphenol-A, bisphenol-F, bisphenol-S, pyrogallol, resorcine, catechol, hydroquinone or phenol and aldehydes or ketones; isocyanate compounds such as methylene-di-p-phenylene-diisocyanate, sulphoxy-m-phenylene-diisocyanate and tolylene-diisocyanate; cyanate compounds such as methylene-di-p-phenylene-dicyanate, hydroxy-di-p-phenylene-dicyanate and sulphon-di-m-phenylene-dicyanate; anhydrides such as phthalic anhydride, hexahydrophthalic anhydride, tetrahydrophthalic anhydride, methyl-tetrahydrophthalic anhydride, methyl-hexahydrophthalic anhydride, nadic anhydride, methylnadic anhydride, chlorendic anhydride, dodecylsuccinic anhydride, methylsuccinic anhydride, benzophenone tetracarboxylic anhydride, pyromellitic anhydride and maleic anhydride. The curable resin composition according to this invention may also contain a radical polymerization initiator such as dicumyl peroxide, t-butyl perbenzoate, methylethyl ketone peroxide, or azo-bisisobutylonitrile as required.

Examples of amino compounds used in the present invention and represented by the above general formula (II) include the following compounds: aniline, toluidines, xylidines, vinylanilines, isopropenylanilines, phenylene diamines, diaminocyclohexane, 2,4-diaminotoluene, 4,4'-diaminodiphenylmethane, 3,4'-diaminodiphenylmethane, 2,2-bis(4'-aminophenyl)propane, 4,4'-diaminodiphenylether, 4,4'-diaminodiphenylsulphide, 4,4'-diaminodiphenylsulphone, 4,4'-diaminodicyclohexyl methane, m-xylylenediamine, p-xylylenediamine, bis(4-aminophenyl)diphenylsilane, bis(4-aminophenyl) methylphosphinoxide, bis(4-aminophenyl)methylphosphinoxide, tris(4-aminophenyl)thiophosphate, tris(4-aminophenyl)phosphate, 1,5-diaminonaphthalene, ethylene diamine, trimethylene diamine, tetramethylene diamine, hexamethylene diamine, nonamethylene diamine, 4-methyl-2,4-bis(p-aminophenyl)pentene-1,4-methyl-2,4-bis(p-aminophenyl)pentene-2, as well as polymers of isopropenylanilines, polymers of vinylanilines, polyamines obtained through reactions between aromatic amines(-for example, aniline, toluidines, xylidines and anisidines) and aldehydes or ketones(for instance, formaldehyde, acetaldehyde, and acetone), especially, poly(phenylmethylene) polyamine obtained from the reaction between aniline and formaldehyde.

As described above, the amino compound may be aliphatic, alicyclic or aromatic. It may be substituted by various substituents. In addition, the amino compound may contain in its molecule various metallic elements, or oxygen, halogens, sulphur, phosphorus or silicon.

There is no specific limitation to the amount of the amine to be employed. However, the weight ratio of the amino compound to the N-(alkenylphenyl)maleimide compound component is preferably within a range of 3:97–97:3, more preferably, within a range of 5:95–95:5. If the amino compound is used below the lower limit thereof, the effects expected from the incorporation of the amino compound, for example, the effects to further improve the excellent solubility of a composition consisting of the N-(alkenylphenyl)maleimide component and epoxy resin to solvent as well as to enhance the impact resistance of a resulting cured product would be scarcely recognized. On the other hand, if the amino compound is used beyond the upper limit thereof, the heat resistance of a resulting cured product would be substantially lowered and, when used as insulative varnish or in copper-lined laminates, there is a danger that it would accelerate the corrosion of copper. It would also be accompanied by another drawback that, when impregnated in glass cloth and formed into a laminate, the fluidity of the resin composition would become excessive. The optimum amount of the amino compound varies depending on the number of double bonds of maleimido groups and groups other than the maleimido groups in the maleimide component as well as the number of epoxy groups in the epoxy resin.

The curable resin composition according to this invention comprises the maleimide compound of the general formula (I), epoxy resin and amino compound of the general formula (II). It may be constituted by a prepolymer of any two components out of the three components and the remaining component so long as the effects of the invention are not impeded.

Namely, after reacting the maleimide compound and amino compound in advance, the reaction product may be mixed with the epoxy resin, thereby forming the curable resin composition of this invention. There is no specific limitation to the mixing ratio of the maleimide compound and amino compound when they are reacted. However, the number ratio of all amino groups in the amino compound to all maleimido groups in the maleimide component(expressed by equation(V) below) is preferably not greater than 1, more preferably, within a range of from 1 to 0.01.

$$\frac{m_a \cdot n_a}{M_a} / \frac{m_i \cdot n_i}{M_i} \leq 1 \qquad (V)$$

wherein, $m_i$, $n_i$ and $M_i$ indicate, respectively, the amount of the maleimide compound used, the average number of maleimido groups in its molecule, and its average molecular weight, whereas $m_a$, $n_a$ and $M_a$ represent, respectively, the amount of the amine component used, the average number of amino groups in its molecule and its average molecular weight.

The reaction between the maleimido compound and amino compound may generally be effected by either mixing both compounds directly without any solvent and heating same to an intimate mixture or reacting both compounds in the forms of homogeneous solutions or suspensions using a solvent. However, the reaction method shall not be limited to such specific reaction methods. The reaction is preferably carried out at a temperature of 50°–200° C. and for a period of 0–20 hours. Catalyst or additives may also be added as needed.

It is also possible to prepare the curable resin composition according to this invention by first mixing and reacting the epoxy resin and amino compound together and then combining the reaction product with the maleimide compound. In the reaction between the epoxy resin and amino compound, the amino compound serves as a curing agent and is thus polymerized to a higher molecular weight, thereby forming a product insoluble to solvents and infusible. Thus, the ratio of amino groups to epoxy groups is suitably controlled and the reaction product is used as a prepolymer having a molecular weight in the range of 50–8,000, together with the maleimide compound and any other compounds which may be incorporated as required. The curable resin composition according to this invention may also be a composition containing as its constituent component the product obtained by reacting a part of the epoxy resin and a part of the amino compound as described above as well as the remaining epoxy resin, amino compound and maleimide compound; or a composition containing a prepolymer obtained by preliminarily reacting the maleimide compound of the general formula (I) and the epoxy resin as well as the amino compound.

The curable resin composition according to this invention may be used with or without a solvent. When a solventless application method is adopted, it is merely mixed to a uniform mixture and then heated. Where a solvent is used, the solvent may not necessarily be limited to any specific one, but examples of preferred solvents include: 3,4-dioxane, tetrahydrofuran, methylethyl ketone, acetone, methylisobutyl ketone, cyclohexane, chloroform, methylene chloride, trichloroethane, benzene, toluene, xylene, acetonitrile, 2-methoxyethanol, 2-ethoxyethanol, 2-ethoxyethylacetate, diethyl ether, methylcellosolve, ethylcellosolve, etc. Of course, an intimately dissolved composition can be obtained by using N,N-dimethylformamide, N,N-dimethylacetamide, N-methyl-2-pyrrolidone, dimethylsulphoxide, hexamethylphosphoroamide or the like. However, such solvents are accompanied by serious drawbacks as has already been mentioned above, it is preferable to avoid the use of such solvents unless their use is indispensable due to special objective or limitation.

Where a solvent is employed, the concentration of all the resins may vary depending on the application field of the composition and use conditions. In ordinary impregnating varnish, it ranges preferably from 5-80%. For example, when used for the fabrication of laminates, an overall resin concentration lower than 5% makes it difficult to cause a required amount of the resin components to penetrate into glass cloth, thereby requiring to effect an impregnation step repeatedly on in a longer time period and considerably lowering the work efficiency. On the other hand, the presence of the resins in an amount beyond 80% of the composition is practically difficult to achieve in view of the limited solubility and miscibility of the resins. Even if such a composition is available, the viscosity of the solution would be considerably increased and it would be difficult to be defoamed prior to its curing, thereby impeding the work efficiency. A particularly preferred range of the overall concentration of resins is from 10 to 70% by weight.

The composition according to this invention may also be employed in the form of emulsion or suspension.

To the composition according to this invention, the following components may also be added, besides the maleimide compound, epoxy resin and the amino compound which may be used as required, and the reaction product of any two components of these three components:

(1) Powdery reinforcement agents, fillers and thickeners such as alumina, diatomaceous earth, magnesia, kaolin, magnesium carbonate, basic magnesium silicate, calcined clay, fine silica powder and carbon black, as well as, fibrous reinforcement agents and fillers, for example, inorganic fibers such as glass fibers, rock wool, ceramic fibers, asbestos and carbon fibers, pulp, wood flour, linter and polyamide fibers. These powdery or fibrous reinforcement agents and fillers may be used in different amounts depending on the application of the composition and, where the composition is used for the fabrication of laminates or as a molding material, they may be added in an amount of up to 4 times the total weight of the resins.

(2) A coupling agent such as, for example, vinyltriethoxysilane, vinyltris(β-methoxyethoxy)silane, γ-methacryloxypropyltrimethoxysilane, γ-glycidoxypropyltrimethoxysilane, γ-aminopropyltriethoxysilane, N-(trimethoxysilylpropyl)ethylenediamine, N-(dimethoxymethyl-silylpropyl)ethylenediamine, γ-chloropropyltrimethoxysilane, vinyltrichlorosilane, β-3,4-epoxycyclohexylethyltrimethoxysilane, and γ-mercaptopropyltriethoxysilane. The coupling agent is generally added in an amount ranging, preferably, 0.001-10.0%, and more preferably, 0.01-5%, both on the basis of the total weight of the resins.

(3) A fire retardant and/or flame-resistant agent including, for example, tetrabromobisphenol-A, tetrabromophthalic anhydride, brominated epoxy resins(-brominated bisphenol-A, brominated novolaks, and epoxides of other halogenated compounds), decabromodiphenyl ether, hexabromobenzene, tetrabromoterephthalic acid, chlorinated paraffin, Diels-Alder adducts of hexachlorocyclopentadiene, red phosphorus, tricresylphosphate, esters of phosphonic acid, esters of phosphinic acid, phosphoroamidates, antimony trioxide, etc. They may be used within a range of, preferably 1-70%, and more preferably, 5-40%, both on the basis of the total weight of the resins.

(4) One or more kinds of various natural and semi-synthetic substances generally formulated in order to improve the properties of resins in adhesive layers, molded resin product, coating films including, for instance, drying oil, semi-drying oil, oleoresin, rosin, shellac, oil-modified rosin, phenol resins, alkyd resins, urea resins, melamine resins, polyester resins, polyvinylbutyral resin, vinylacetate resin, vinyl chloride resin, acrylic resins and silicone resins. Such resins may be added as much as desired so long as they do not impede the properties inherent to the resin composition of this invention. Namely, they may be added generally in an amount of not higher than 30% by weight of the total amount of the resins.

Curing conditions for converting the curable resin composition according to this invention into a cured product may vary depending on the types of catalyst or resins actually used. They may also vary in accordance with the form of the composition. The composition according to this invention is generally coated onto a substrate as adhesive or coating film or formed or laminated in the form of powder or pellet, or in a state of being impregnated in a substrate, and then heated until cured. The curing temperature ranges generally 0°-300° C., and particularly, 100°-250° C. The heating time for curing the composition is affected, especially, by the form of the composition and is generally within a range of from 30 seconds to 10 hours. It is necessary to apply heat for a time period sufficient to cure the resinous components completely. Where the composition according to this invention is used for the fabrication of a molded or otherwise shaped product, laminate or adhered structure, it is desired to apply a pressure upon effecting the heat-curing. The pressure may range from 1 to 100 kg/m².

There is no particular limitation to be vested to the actual application form of the composition according to this invention. The following are examples of formulations suitable for use as an impregnating varnish and for use in laminates.

A homogeneous solution is prepared by mixing the maleimide compound and epoxy resin, and, optionally, the amino compound which may be added as required, and/or the prepolymer of any two kinds of components among the three components with an organic solvent. It is preferred to use these resins in such amounts that the total concentration of the resins falls within a range of 10-70%. To the thus-obtained solution, another curing agent, a silane-coupling agent and fire retardant may be added as required. Then, they are mixed uniformly into varnish.

The impregnating varnish resulting from the above-described operation is then impregnated in a sheet-like reinforcement material such as glass cloth, glass sheet, non-woven glass fabric, asbestos sheet or the like and, if required, dried in wind for a predetermined time period. Thereafter, it is dried in an oven maintained at 60°–160° C., thereby obtaining a prepreg (preimpregnate). The prepreg obtained with the uniform varnish prepared by the composition of this invention does not develop any separation of its components or foams and, moreover, has preferable dryness to touch. The thus-obtained prepreg can be stored stably over a long period of time at room temperature. A plural sheets of such prepreg are then superposed and, if necessary, a copper foil or copper foils may be applied onto either upper or lower surface of the thus-superposed prepreg or onto both upper and lower surfaces thereof. Thereafter, it is formed under pressure for a certain period of time in a compression-molding machine at a temperature of 100°–250° C. and a pressure of 1–100 kg/cm².

During this compression molding, the resins are fused and exhibit a suitable degree of low characteristics, thereby facilitating the uniform impregnation of the resins. The resins are thus cured as mentioned above and a laminate or copper-lined laminate of good quality is provided.

The present invention will now be described further in the following examples:

EXAMPLE 1

4-Methyl-2,4-bis(p-N-maleimidophenyl)pentene-1 and DEN-431(trade mark, novolak epoxy resin produced by Dow Chemical Company), respectively in the amounts of 38.5 g and 16.5 g, were uniformly dissolved in 45 g of tetrahydrofuran. The thus-prepared varnish was impregnated in glass cloth (thickness: 0.18 mm) and dried for 20 minutes at 100° C., thereby obtaining a preimpregnate. Nine sheets of the thus-prepared preimpregnates were superposed and a sheet of copper foil was then placed on the top of the preimpregnates. At a press pressure of 40 kg/cm², it was heated by raising its temperature from 100° C. to 180° C. over 30 minutes and further heated at 180° C. for one hour, providing a copper-lined laminate. This laminate was subjected to after-curing for 10 hours in an oven of 220° C.

Table 1 shows the resistance of the resulting laminate to the heat of soft solder and the anti-peeling strength of the copper foil.

EXAMPLE 2

In 61.4 g of methylethyl ketone, were dissolved 42.6 g of N-(p-isopropenylphenyl)maleimide oligomer(composition: monomer 2.7%, dimer 77.3%, trimer 6.7%, tetramer and higher polymers 13.3%), 9.9 g of 4,4'-diaminodiphenylmethane and 22.5 g of Epikote-828(trade mark; bisphenol-type epoxy resin produced by Shell International Chemical Inc.). Glass cloth(thickness: 0.18 mm) was impregnated with the thus-prepared varnish and then dried at 95° C. for 15 minutes, thereby providing a preimpregnate. Nine sheets of the thus-prepared preimpregnates were superposed and a sheet of copper foil was then placed on the top of the preimpregnates. It was thereafter pressed, bonded under pressure, and cured in accordance with the following conditions. Namely, at a press pressure of 40 kg/cm², it was heated by raising its temperature from 100° C. to 180° C. over 30 minutes and maintained at 180° C. for further one hour.

Table 1 also shows the resistance of the resulting laminate to the heat of soft solder and the anti-peeling strength of the copper foil.

EXAMPLE 3

After thoroughly grinding and mixing 213 g of the linear dimer mixture of N-(p-isopropenylphenyl)maleimides consisting of 89.5% of 4-methyl-2,4-bis(p-N-maleimidophenyl) pentene-1 and 10.5% of 4-methyl-2,3-bis(p-N-maleimidophenyl) pentene-2 and 50 g of 4,4'-diaminodiphenylmethane, the resulting mixture was heated at 125° C. to a fused state, in which they were reacted to each other for 20 minutes. Subsequent to cooling down the reaction product and grinding the same, the resulting 44 g of powder and 11 g of DEN-431 were dissolved in 45 g of 1,4-dioxane, thereby providing varnish.

The thus-prepared varnish was used to produce a laminate under the same conditions as in Example 1. The resistance of the laminate to the heat of soft solder and the anti-peeling strength of the copper foil were measured. Measurement results are also shown in Table 1.

COMPARATIVE EXAMPLE 1

Powder obtained by thoroughly grinding and mixing 89.6 g of N,N'-(methylene-di-p-phenylene)bismaleimide and 24.8 g of 4,4'-diaminodiphenylmethane was heated to 120° C., thereby fusing same and then reacting the compounds to each other for 10 minutes. The reaction product was then cooled down to solid. The resulting solid was ground again, providing 41 g of powder, which was then dissolved together with 10 g of DEN-431 in 45 g of N,N-dimethylformamide, resulting in varnish. Glass cloth(thickness: 0.18 mm) was impregnated with the varnish and dried at 160° C. for 20 minutes, thereby obtaining a preimpregnate. Nine sheets of the thus-obtained preimpregnates were superposed and a sheet of copper foil was then placed on the top of the preimpregnates. At a press pressure of 40 kg/cm², it was heated by raising its temperature from 120° C. to 180° C. over 30 minutes and then heated at 180° C. for further one hour, resulting in a copper-lined laminate.

The resistance of the laminate to the heat of soft solder and the anti-peeling strength of the copper foil are also shown in Table 1.

COMPARATIVE EXAMPLE 2

In 45 g of N-methyl-2-pyrrolidone, were intimately dissolved 41 g of N,N'-(methylene-di-p-phenylene)bismaleimide and 14 g of EPN-1138(trade mark; novolak-type epoxy resin produced by Ciba-Geigy AG). A copper-lined laminate was prepared under conditions similar to those used in Comparative Example 1. Its resistance to the heat of soft solder and the anti-peeling strength of the copper foil are shown in Table 1.

TABLE 1

| Property | Example No. | | | | |
|---|---|---|---|---|---|
| | 1 | 2 | 3 | 1* | 2* |
| Resistance to heat of soft solder (300° C.) (sec) | 130 | 120 | 127 | 100 | 115 |
| Anti-peeling strength of copper foil | 1.32 | 1.57 | 1.51 | 1.21 | 1.09 |

EXAMPLE 4

In 50 g of methylethyl ketone, were dissolved 47 g of N-(p-isopropenylphenyl)maleimide oligomer(composition: monomar 3.7%, dimer 83.3%, trimer 5.1%, tetramer and higher polymers 7.9%) and 3 g of Epikote(-trade mark; bisphenol-type epoxy resin produced by Shell International Chemicals Inc.) to form varnish. The stability of the varnish was determined by virtue of variations in its viscosity. Results are shown in Table 2.

COMPARATIVE EXAMPLE 3

With 50 g of methylethyl ketone, were mixed 47 g of a prepolymer produced from N,N'-(methylene-di-p-phenylene) bismaleimide and 4,4'-diaminodiphenylmethane as in Comparative Example 1. However, the latter were insolble to the former. Substitution of 50 g of N-methyl-2-pyrrolidone for methylethyl ketone resulted in a uniform solution. The stability of the thus-prepared varnish was determined through measuring its viscosity. Results are also shown in Table 2.

TABLE 2

| | Number of days allowed to stand | | | |
|---|---|---|---|---|
| | 0 | 7 | 14 | 21 |
| Example 4 | ≦0.5 | 0.5 | 0.5 | 0.5 |
| Comparative Example | 8.8 | 17.6 | 36.2 | 63.4 |

Note 1: unit poise (25° C.)
Note 2: Measurement method bubble viscometer (Gardner-Holdt method)

EXAMPLE 5

In 100 g of methylethyl ketone, were dissolved 80 g of N-(p-isopropenylphenyl)maleimide oligomer(composition: monomer 3.7%, dimer 83.3%, trimer 5.1%, tetramer and higher polymers 7.9%), 20 g of Epikote-828, 5.5 g trimellitic anhydride and 1.1 g of 4,4'-diaminodiphenylsulphone to form a uniform solution. Then, methylethyl ketone was allowed to evaporate from the solution at 50° C. and at a reduced pressure, leaving a resin composition. This composition was poured into a mold which had been in advance coated with a parting agent and maintained at 110° C. The mold was made of stainless steel. It was then degasified under a reduced pressure and, thereafter, pressed under a pressure of 70 kg/cm² and slowly heated and cured, first at 170° C. for one hour and then at 200° C. for 3 hours. After cooling down the thus cured molded product to room temperature, it was withdrawn from the mold and a resin plate (i.e., test specimen) of 3 mm × 100 mm × 100 mm was obtained. The thermal deformation temperature, dielectric constant and dielectric loss tangent of the thus-cured resin plate were respectively 312° C., 2.84 (1 MHz, at 25° C.) and 0.011 (1 MHz, at 25° C.). Another resin plate (4 mm × 10 mm × 100 mm) prepared similarly had bending strength of 16.3 kg/mm² at 25° C.

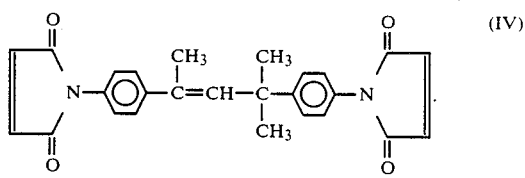

What is claimed is:

1. A curable resin composition comprising:
   (a) at least one maleimide compound selected from the group consisting of N-(alkenylphenyl)maleimides represented by the general formula (I):

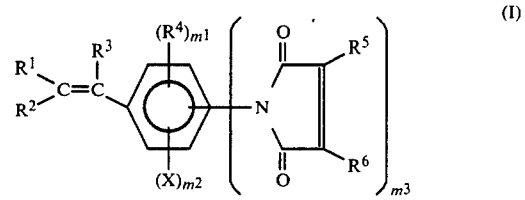

wherein $R^1$–$R^6$ are the same or different from one another and denote independently hydrogen, a hydrocarbon group having 1-20 carbon atoms, a halogen, $R^7O$— or

group where $R^7$ represents a hydrocarbon group having 1-20 carbon atoms or a hydrocarbon group having 1-20 carbon atoms and substituted by one or more halogen atoms, hydroxyl group, cyano group, or a hydrocarbon group substituted by one or more halogens, $R^7O$— or

group, hydroxyl group or cyano group and having 1-20 carbon atoms prior to the substitution, a plurality of $R^4$s are the same or different when $m^1$ stands for a value of 2 or greater, $R^3$ is coupled with either $R^1$ or $R^2$, thereby forming a ring, X denotes at least one atom or group selected from hydrogen, halogens, hydroxyl groups, $R^7O$—

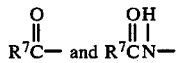

groups, where $R^7$ is as defined above, cyano group, nitro group or carboxyl group, a plurality of Xs are the same or different when $m^2$ stands for a value of 2 or greater, and $m^1$, $m^2$, and $m^3$ represent independently a positive integer and $m^1 + m^2 + m^3 = 5$, dimers of said maleimides and polymers of said maleimides having a polymerization degree of at least 3;
   (b) at least one epoxy compound, each having at least one 1,2 epoxy group in the unit molecule thereof; and,
   (c) an amino compound represented by the general formula (II):

$$Q\text{-}(NH_2)_n \qquad (II)$$

wherein Q indicates an organic group having 1-150 carbon atoms and a valence of n, Q contains at least one kind of atom selected from hydrogen, oxygen, sulphur, halogen, nitrogen, phosphorus or silicon atoms, and n represents an integer of at least 1, and said composition contains at least one kind of a prepolymer of at least parts of any two components among components (a), (b) and (c).

2. A curable resin composition as claimed in claim 1, wherein said amino compound is an amino compound containing one or more benzene rings.

3. A curable resin composition as claimed in claim 1, wherein said amino compound is a reaction product of aniline and formaldehyde.

4. A curable resin composition as claimed in claim 1, wherein said amino compound is 4,4'-diaminodiphenyl methane.

5. A curable resin composition as claimed in claim 1, wherein the weight ratio of component (c) to component (a) ranges from 3:97 to 97:3.

6. A curable resin composition as claimed in claim 1, wherein the prepolymer is formed by a part of component (c) and a part of component (a) and the weight ratio of component (c) to component (a) in said prepolymer is such that the number ratio of all amino groups in component (c) in the prepolymer to all maleimido groups in component (a) in the prepolymer is 1 or less.

7. A curable resin composition as claimed in claim 6, wherein said composition further comprises one or more resins selected from the group consisting of drying oil, semidrying oil, oleoresin, rosin, shellac, oil-modified rosin, phenol resins, alkyd resins, urea-formaldehyde resins, melamine-formaldehyde resins, unsaturated polyester resins, polyvinylbutyral resins, vinylacetate resins, vinylchloride resin, acrylic resins and silicone resins, and said one or more resins are contained in total in an amount of not more than 30% of the weight of the entire resins.

8. A curable resin composition as claimed in claim 1, wherein said maleimide compound is at least one maleimide compound selected from the group consisting of N-(p-isopropenylphenyl)maleimide, dimers thereof and polymers thereof having a polymerization degree of at least 3.

9. A curable resin composition as claimed in claim 1, wherein said maleimide compound is at least one dimer or N-(p-isopropenylphenyl)maleimide.

10. A curable resin composition as claimed in claim 9, wherein the linear dimer of N-(p-isopropenylphenyl)maleimide is at least one dimer selected from 4-methyl-2,4-bis(p-N-maleimidophenyl)pentene-1 or 4-methyl-2,4-bis(p-N-maleimidophenyl)pentene-2.

11. A curable resin composition as claimed in claim 1, wherein component (a) is a mixture of N-(isopropenylphenyl)maleimide, dimers thereof and one or more of polymers thereof having a polymerization degree of at least 4.

12. A curable resin composition as claimed in claim 11, wherein said mixture contains at least 70% of dimers of N-(p-isopropenylphenyl)maleimide.

13. A curable resin composition as claimed in claim 1, wherein said epoxy resins include at least one epoxy resin containing benzene rings.

14. A curable resin composition as claimed in claim 1, wherein said epoxy resins include at least one bisphenol-type epoxy resin.

15. A curable resin composition as claimed in claim 1, wherein said epoxy resins include at least one novolak-type epoxy resin.

16. A curable resin composition as claimed in claim 1, wherein the weight ratio of component (b) to component (a) ranges from 3:97 to 97:3.

17. A curable resin composition as claimed in claim 1, wherein said composition is substantially free of solvent.

18. A curable resin composition as claimed in claim 1, wherein said composition further comprises an organic solvent.

19. A curable resin composition as claimed in claim 1, wherein said composition further comprises at least one solvent compound selected from the group consisting of tetrahydrofuran, methylethyl ketone, 1,4-dioxane, acetone, methylisobutyl ketone, dichloromethane, trichloroethane, benzene, toluene, xylene, acetonitrile, 2-methoxyethanol, 2-n-butoxyethanol, 2-ethoxyethylacetate, diethylether, methylcellosolve, ethylcellosolve, N,N-dimethylformamide, N,N-dimethylacetamide and N-methyl-2-pyrrolidone.

20. A curable resin composition as claimed in claim 1, wherein said composition further comprises at least one solvent compound selected from the group consisting of tetrahydrofuran, methylethyl ketone, 1,4-dioxane, acetone, acetonitrile, methylcellosolve, and ethylcellosolve.

21. A curable resin composition as claimed in claim 1, wherein said composition further comprises one or more powdery materials other than resins and said powdery materials are contained in total in an amount up to 4 time the weight of the entire resins.

22. A curable resin composition as claimed in claim 1, wherein said composition further comprises a coupling agent in an amount of 0.001–10% by weight of the entire resins.

23. A curable resin composition as claimed in claim 1, wherein said composition further comprises a coupling agent in an amount of 0.01–5% by weight of the entire resins.

24. A curable resin composition as claimed in claim 1, wherein said composition further comprises at least one kind of fire retardants and flame resistant agents in an amount of 1–70% by weight of the entire resins.

25. A curable resin composition as claimed in claim 1, wherein said composition further comprises at least one kind of fire retardants and flame resistant agents in an amount of 5–40% by weight of the entire resins.

26. A curable resin composition as claimed in claim 1, wherein said composition further comprises a curing agent for component (b).

27. A curable resin composition as claimed in claim 1 wherein said composition further comprises a radical polymerization initiator.

28. A curable resin composition as claimed in claim 1, wherein said maleimide compound is at least one linear dimer of N-(p-isopropenylphenyl)maleimide, the linear dimer being selected from the group consisting of:

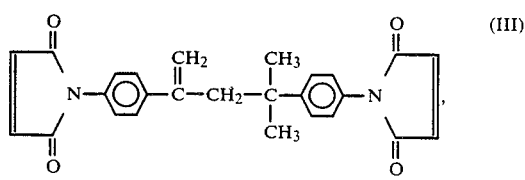

or